US006795018B2

(12) United States Patent
Guo (10) Patent No.: US 6,795,018 B2
(45) Date of Patent: Sep. 21, 2004

(54) SMART ANTENNA ARRAYS (75) Inventor: Yingje Jay Guo, Aylesbury (GB)

(73) Assignee: Mobisphere Limited, Bracknell (GB)

(*) Notice: Subject to any disclaimer, the term of this patent is extended or adjusted under 35 U.S.C. 154(b) by 0 days.

(21) Appl. No.: 10/152,799

(22) Filed: May 23, 2002

(65) Prior Publication Data
US 2002/0187812 A1 Dec. 12, 2002

(30) Foreign Application Priority Data
Jun. 12, 2001 (GB) .............................................. 0114268

(51) Int. Cl.$^7$ .............................................. H01Q 3/26
(52) U.S. Cl. ..................................... 342/372; 342/374
(58) Field of Search ............................... 342/368–384; 455/561, 562

(56) References Cited

U.S. PATENT DOCUMENTS

| 4,425,567 | A |   | 1/1984 | Tresselt |
| 5,634,199 | A |   | 5/1997 | Gerlach et al. ............... 455/63 |
| 5,754,138 | A |   | 5/1998 | Turcotte et al. ............ 342/373 |
| 6,049,307 | A | * | 4/2000 | Lim ........................... 342/383 |
| 6,188,915 | B1 |   | 2/2001 | Martin et al. |
| 6,226,531 | B1 |   | 5/2001 | Holt et al. |
| 6,233,466 | B1 |   | 5/2001 | Wong et al. |

FOREIGN PATENT DOCUMENTS

| GB | 2 189 348 A | 5/1979 |
| GB | 2111311 | 6/1983 |
| GB | 2 313 261 A | 5/1996 |
| GB | 2 328 320 A | 8/1998 |
| WO | WO 98/42150 | 9/1998 |
| WO | 98/43106 A2 | 10/1998 |
| WO | 98/43106 A3 | 10/1998 |
| WO | WO 99/57820 | 11/1999 |

OTHER PUBLICATIONS

M. Plonski, Algorithms define smart antenna, EE Times, Jun. 2000.*
W.A. Kissick et al., National Institute of Justice Antenna System Guide, NIJ Guide 202–00, Chapter 5, Apr. 2001.*

D. Warren, How to Become An Antenna Guru, http://www.borg.com/~warrend/guru.html, Dec. 1998.*

A flat four–beam switched array antenna, N. Kuga et al., IEEE Tranasctions on Antennas and Propagation, vol. 44(9), p. 1227–1230, Sep. 1996.*

Adaptive sector size control in a CDMA system using Butler matrix, M. Mahmoudi et al., IEEE 49th Vehicular Technology Conference, vol. 2, p. 1355–1359, Jul. 1999.*

An Overview of Smart Antenna Technology for Mobile Communications Systems, P.H. Lehne, IEEE Communications Surveys, 1999.—http://www.comsoc.org/livepubs/surveys/public/4q99issue/lehne.html.*

A flat four–beam compact phased array antenna, M. Krairksh et al., IEEE Microwave and Wireless Components Letters, vol. 12(5), p. 184–186, May 2002.*

British Search Report.

* cited by examiner

Primary Examiner—Thomas H. Tarcza
Assistant Examiner—F H Mull
(74) Attorney, Agent, or Firm—Crowell Moring LLP (57) ABSTRACT The present invention relates to a beamforming method for smart antenna arrays, and in particular relates to a beamforming method for smart two-dimensional antennas. Smart antennas employ arrays of low gain antennas connected to a combining/beamforming network. Smart antennas can provide enhanced coverage through range extension, hole filling and improved building penetration. By improving transmission and reception at the base station, the tolerable path losses can be increased whereby the range of the base station can be improved. A first aspect of the invention thus provides a method of generating low sidelobe beampatterns for 2-dimensional arrays. A further aspect addresses the feedback signalling techniques which are presently being considered by standard bodies for four antennas in large arrays. The invention is suitable for CDMA wireless cellular systems, as presently determined for third generation cellular wireless networks, and other wireless systems such as TDMA systems and wireless LANs.

16 Claims, 10 Drawing Sheets

SMART ANTENNA ARRAYS

FIELD OF THE INVENTION

This invention relates to a beamforming method for smart antenna arrays, and in particular relates to a beamforming method for vertically oriented smart antennas arranged in two-dimensional arrays.

BACKGROUND TO THE INVENTION

Smart antenna arrays, otherwise known as adaptive antenna arrays, comprise of low gain antennas connected to a combining/beamforming network. Smart antennas can provide enhanced coverage through range extension, hole filling and improved building penetration. By improving transmission and reception at the base station, the tolerable path losses can be increased whereby the range of the base station can be improved. By using smart antennas at the base station, initial deployment costs of a wireless network can be reduced: with the development in system usage, system capacity can be increased by adding additional cell sites and decreasing the range of existing base stations.

Digital beamforming, whereby smart antenna arrays are conveniently implemented, is considered as one of the most promising techniques for forthcoming mobile telecommunications networks such as UMTS networks. Linear and planar antenna arrays are normally considered as candidate antenna types, since they produce low sidelobe levels with respect to other types of antenna such as the circular array. If a communications antenna array produces high sidelobes in the beampattern, it will cause strong interfering signals to mobile terminals in some directions, which can be a severe problem for downlink transmission.

In the current UTRAN specification (R'99), there is a transmit diversity scheme based on the feedback from mobile terminals. The idea is to transmit different signals of constant power from two different antennas to all the mobile terminals in a cell. The mobile terminals report the signal magnitude and phase to the base station periodically, upon which the base station adjusts its antenna weights for the transmission of dedicated signals. Currently, within 3GPP, there is a plan to extend the transmit diversity scheme to four antennas, but it is, at present, unlikely that such a technique will ever be extended further to a greater number of antennas.

OBJECT OF THE INVENTION

The present invention seeks to provide an improved antenna arrangement suitable for use in a cellular base station. The present invention further seeks to provide an antenna arrangement operable to increase the capacity of a cellular communications base station.

STATEMENT OF THE INVENTION

In accordance with a first aspect of the invention, there is provided a smart antenna basestation arrangement comprising a 2-dimensional array of antennas, which antenna elements provide omni-directional beam coverage in the horizontal plane, wherein:

stored beamforming weight sets optimised for specific beam directions are operable to enable the array to generate directional downlink beams.

Preferably the array has a physical periodicity whereby to reduce the number of principal weight sets for specific beam directions. This periodicity can conveniently comprise a small angular range for a regular circular array of many antennas, a 90° angular range for a balanced square array, a 120° angular range for a regular triangle and a 180° angular range for a rectangle, for example, the specific beam directions being associated with an angular range. In a case where the array comprises a circular array with regular spacing between the elements, for angles between the selected beamforming weights, the weights can be determined by means of rotation and/or interpolation. That is to say, instead of having a single weight set to cover all angles of beam direction about the antenna, there is a weight set for a limited arc, e.g. 30°—such a weight set can be rotated in 30° steps, twelve times to provide 360° coverage about the antenna. If the 3 dB beamwidth is less than 20°, then interpolation is required for angles between the period.

In accordance with a further aspect of the invention, there is provided a base station arrangement operable to exploit the feedback signalling technique proposed in 3GPP. This technique has been developed specifically for downlink beamforming in UTRAN, but they can also be used for uplink beamforming as well as in other wireless systems. A pilot (common control channel) signal may be transmitted by one antenna for a sub-array: feedback signals may be employed to assist the determination of an appropriate weight set.

A first aspect of the invention thus provides an arrangement operable to generate low sidelobe beampatterns for 2-dimensional arrays. A further aspect addresses the feedback signalling technique presently being considered by 3GPP for four antennas in large arrays. The invention is suitable for CDMA wireless cellular systems, as presently determined for third generation cellular wireless networks, and other wireless systems such as TDMA systems and wireless LANs.

A regular two dimensional array of omni-directional antennas and, in particular the circular array, has a number of advantages over linear and planar arrays for the application of smart antennas in wireless cellular networks. If elements with omni-directional patterns in the horizontal plane are used, every antenna element, or at least a high proportion of the antenna elements, will be able to contribute to the transmission and reception of radio signals, thus resulting in the benefits, inter alia, of: low cost of linear power amplifiers (LPA) due to lower power handling requirements; higher antenna gain; higher spatial diversity gain due to antenna distribution, and; signalling for soft (intersector) handover is redundant, which provides a further capacity increase.

The present invention therefore can assist in the realisation of advantages with omni-directional smart antennas based on 2-dimensional arrays. For example, the present invention provides, in one embodiment, a circular antenna array with low sidelobes in the beampattern, thus reducing interference to other users and enabling the use of SDMA; enabling higher downlink capacity; allowing the coexistence of higher data rate services with voice services; and making it possible to apply the 3GPP feedback technique for four antennas to large arrays of vertically oriented omni-directional antennas, the arrays being linear (in two dimensions), circular or planar.

BRIEF DESCRIPTION OF THE FIGURES

The invention may be understood more readily, and various other aspects and features of the invention may become apparent from consideration of the following description and the figures as shown in the accompanying drawing sheets, wherein:

FIGS. 8a and b show some low sidelobe patterns in the horizontal plane from an omni-directional antenna array, at a frequency of 2 GHz;

DETAILED DESCRIPTION OF THE INVENTION

There will now be described, by way of example, the best mode contemplated by the inventors for carrying out the invention. In the following description, numerous specific details are set out in order to provide a complete understanding of the present invention. It will be apparent, however, to those skilled in the art, that the present invention may be put into practise with variations of this specific.

Figure 1:
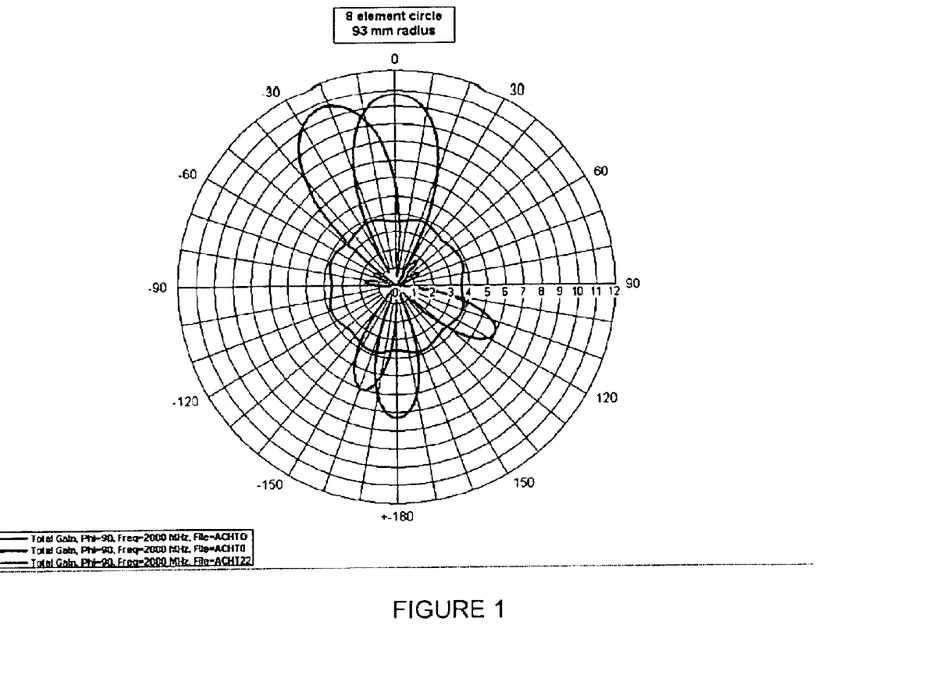
FIG. 1 shows beampattern examples of a circular array.

Hitherto, the use of circular arrays has been limited since most beamforming algorithms tend to generate high sidelobes when used for circular arrays, thus causing strong interference to other mobiles and limiting the use of spatial domain multiple access (SDMA). The use of other types of 2-dimensional arrays, not being circular, certainly has not been publicised, but would also suffer from similar problems. Referring to FIG. 1, there is shown some beampatterns of Siemens' TD-SCDMA circular antenna array. It is seen that the sidelobe level (of directional beams) can be as high as −4 dB, whereas it is not difficult to achieve −12 dB sidelobe level for a linear array. The problem is especially severe for W-CDMA networks as code shortage in the downlink effectively limits the data rate. A reference pattern, substantially uniform in all directions is shown, provided by a single omni-directional antenna.

The beampattern of an antenna array is determined to a large extent by the beamforming weights. For linear arrays, there are a number of well-known weight distribution functions which produce low sidelobes, such as Taylor and Chebyshev distributions. For non-linear arrays, unfortunately, there is no easy solution. In theory, given the constraint conditions and objective function, the weights of an array can be optimised in real time by the use of optimisation methods. In practice, however, such a technique is difficult to implement due to the excessive demand on the signal processing power.

Figure 2:
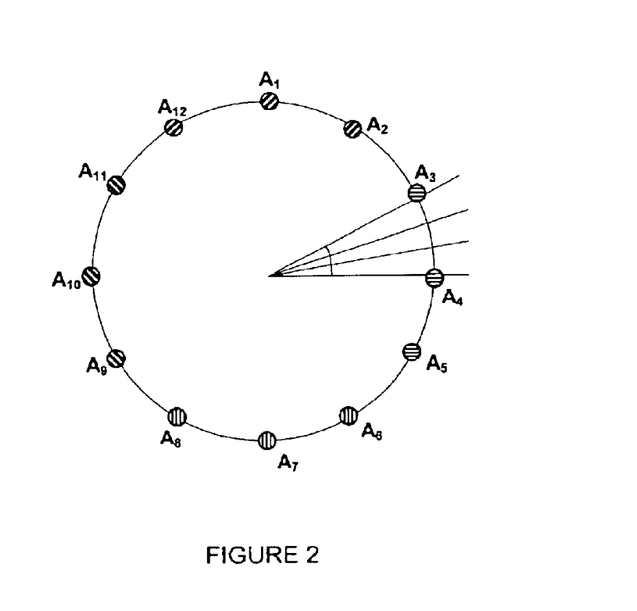
FIG. 2 shows a 2-dimendional arrangement of omni-directional antennas arranged in a circle.

Referring now to FIG. 2, the present invention provides, in a first embodiment, a periodic circular array of omnidirectional antennas $A_1$–$A_{12}$; a beamforming means is operable to generate a group of optimised patterns with low sidelobes in the angular directions between any two adjacent elements, in the horizontal plane, to cover an angular range. In order to cover a range of 360°, only a small weight set operable to cover an angular period is required: each angular period between adjacent antennas is a repetition in terms of the weight applied to other angular periods about a central axis of the antenna arrangement. For example a weight set comprising a weight for a beam to be formed in a radial direction from one antenna element together with weights for a number of angles between that antenna element and one of its adjacent antenna elements can be stored to cover one twelfth of the area about the base station: rotation of the weight set twelve times over 360° provides coverage for the whole space surrounding the antenna arrangement. Such an optimum group of beamforming weight sets can be stored in a buffer or other ROM device. The optimum weight set can be used in any other direction by interpolation and rotation of the weight assignment.

Figure 3:
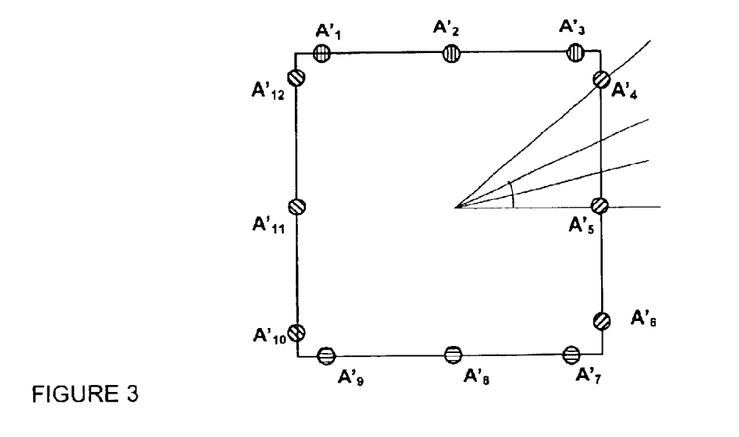
FIG. 3 shows a 2-dimensional arrangement of omni-directional antennas arranged in a square.

FIG. 3 shows an antenna arrangement with the antenna elements $A'_1$–$A'_{12}$, being omni-directional in the horizontal plane, arranged in a square. There are four 90° angular periods of rotational symmetry: rotation of the weight set four times over 360° provides coverage for the whole space surrounding the antenna arrangement.

The direction of the downlink beam needs to be determined. This information can be obtained in a number of ways: for example feedback signal may disclose the position by virtue of the Global Positioning System (GPS), by triangulation through the network or the base station itself, as is known. When the downlink beamforming is needed and the direction of the beam is given, a weight set is assigned based on the stored optimum weight set group, and a beampattern with guaranteed low sidelobe level is produced.

Figure 4:
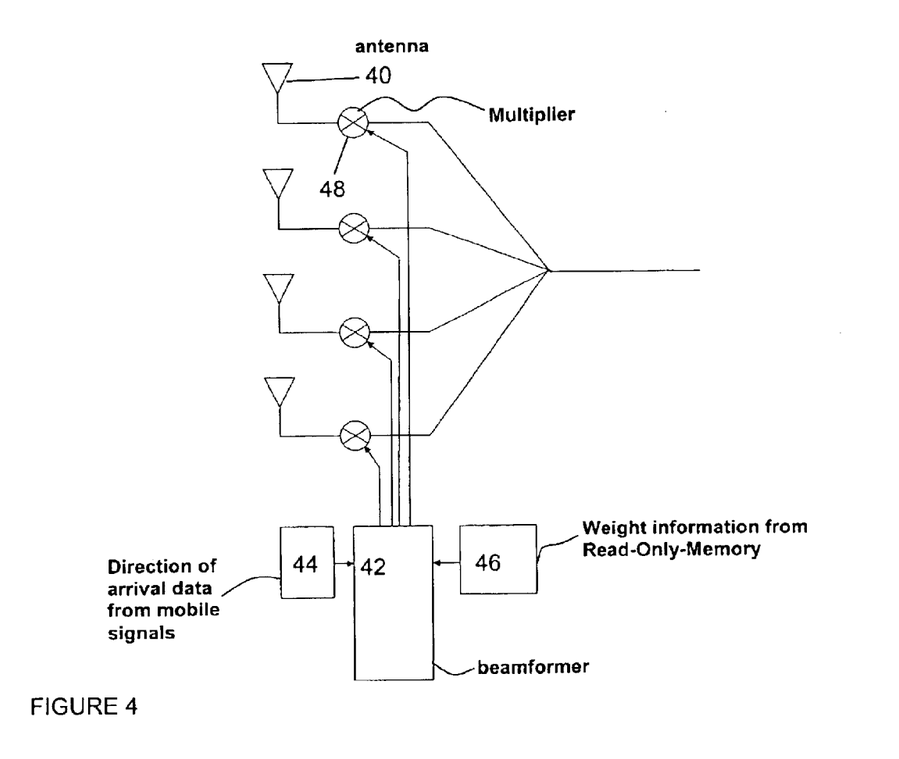
FIG. 4 shows a basic adaptive beamformer configuration.

FIG. 4 shows a schematic configuration of the downlink beamformer; only four antenna elements 40 are shown here, but the beamformer 42 takes into account the direction of arrival of signals 44 which are obtained from a mobile with which it is desired to communicate; weight information is obtained from a ROM 46 or similar. The signals from the beamformer are applied to the antenna input feed by way of multipliers 48. When communication is desired, stored weights corresponding to the directions are obtained; rotation or rotation and interpolation data is factored in and the signals to the antennas are appropriately weighted.

Figure 5:
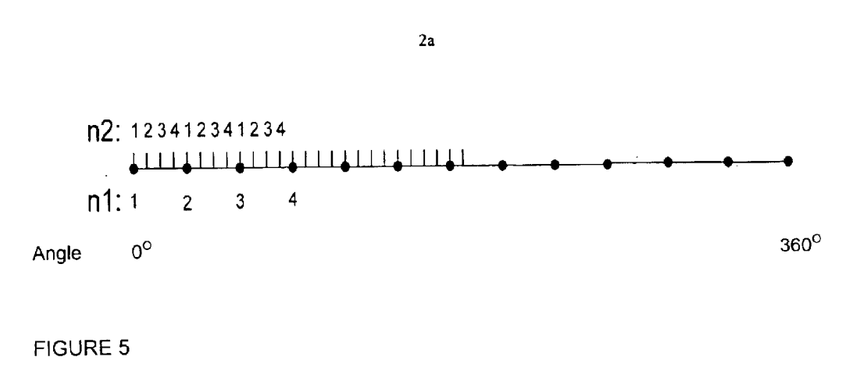
FIG. 5 shows a main beam array pattern interpolation/rotation scale.

FIG. 5 shows how a 360° angular range, being part of an omni-directional beam is divided into 12 'n1' main beams: for example corresponding to the twelve antenna directions of the circular arrangement of FIG. 2. In a simple case, it may be that the rotation of the main beam into any one of twelve antenna directions may be sufficient, then reference need not be made to the n2 weights to provide intermediate beams. Nevertheless n2 intermediate beams would need to be relied upon if the 3 dB beamwidth was less than 30°, for a twelve beam arrangement. The example of FIG. 5 shows four intermediate beams.

Figure 6:
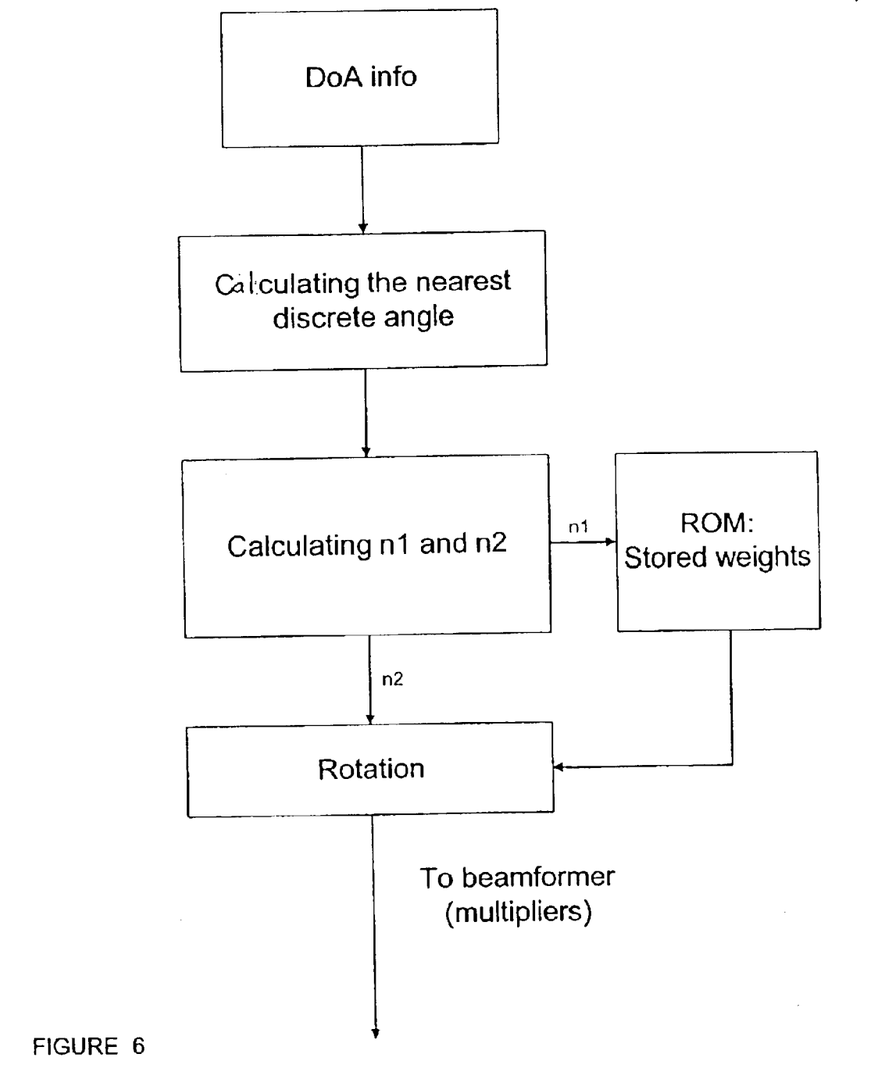
FIG. 6 shows a flow chart relating to beamforming in accordance with a first aspect of the invention.

FIG. 6 shows a first flowchart, also with reference to FIG. 4, where direction of arrival of feed back data from a mobile of a mobile user with whom communication is desired is received by processor 44: the nearest discrete angles relative to a reference are determined. Beamformer 42 refers to stored weight data in ROM 46. In this Figure the direction of arrival (DoA) information corresponds with a main beam direction, the 3 dB beamwidth being such that only rotation of the main beam is required to enable all areas of the cell to be covered. Note, however, that it is possible to determine main beam directions which are independent of any periodicity of the two dimensional array. It will be appreciated that, if the beamwidth is sufficiently broad or there are sufficient stored weights, it is advantageous not to have interpolation between main beam directions since non-regular interpolation can make calculations more difficult or require more processing power/more memory.

Figure 7:
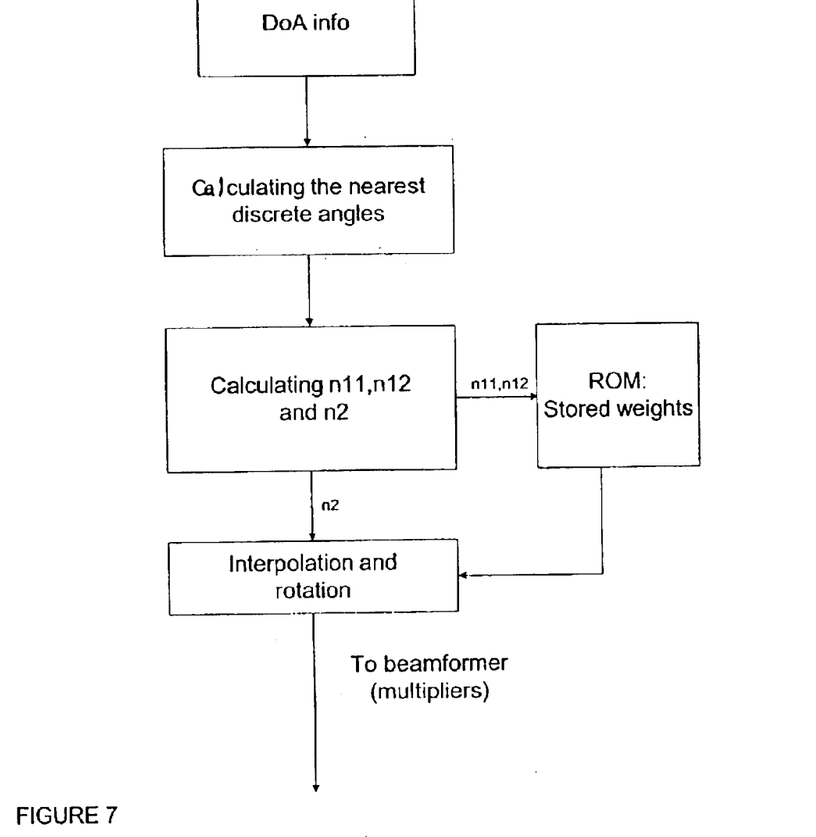
FIG. 7 shows a flow chart relating to a second aspect of the invention.
Figure 8:
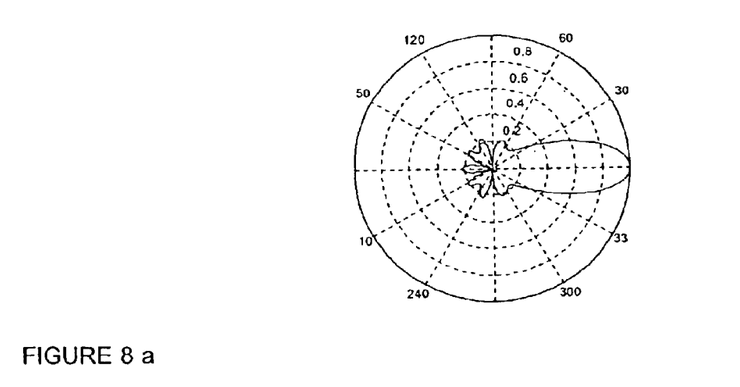

FIG. 7 shows a second flow chart. As in the case of FIG. 6 DoA information is processed to determine the nearest discrete angle relative to a reference (step 2). An interpolation weight set index must be relied upon to determine, together with the rotation weights, an interpolated and rotated main beam (steps 3–5). As with FIG. 6, the signals drive beamformer multipliers 42. FIGS. 8*a* & *b* show two optimised low-sidelobe beampatterns. It will be appreciated that the sidelobes are low, being less than −12 dB.

In the R'99 UTRAN specification, a feedback mechanism was introduced to assist the transmit diversity technique employing two antennas. The concept is to transmit downlink signals of constant power from two different antennas using different scrambling codes to all the mobiles in the common channels and then to adapt the antenna weights for dedicated channels according to the feedback received from the intended mobile. Currently, there is great commercial interest in proposals to introduce feedback signalling to four antennas. Such feedback information enables adaptive beamforming for arrays with four elements. On the one hand, owing to the limited bandwidth for signalling, it is unlikely that any signalling mechanism for more than four antennas will be ever introduced. On the other hand, circular arrays for cellular networks need at least eight antennas to achieve significant array gain. Also, it is conceivable that linear antenna arrays consisting of more than four elements will be used in future UTRAN products. Therefore, new beamforming techniques which enable the exploitation of the current feedback signalling scheme, which are limited to two and four antennas, for large arrays are needed.

Figure 9:
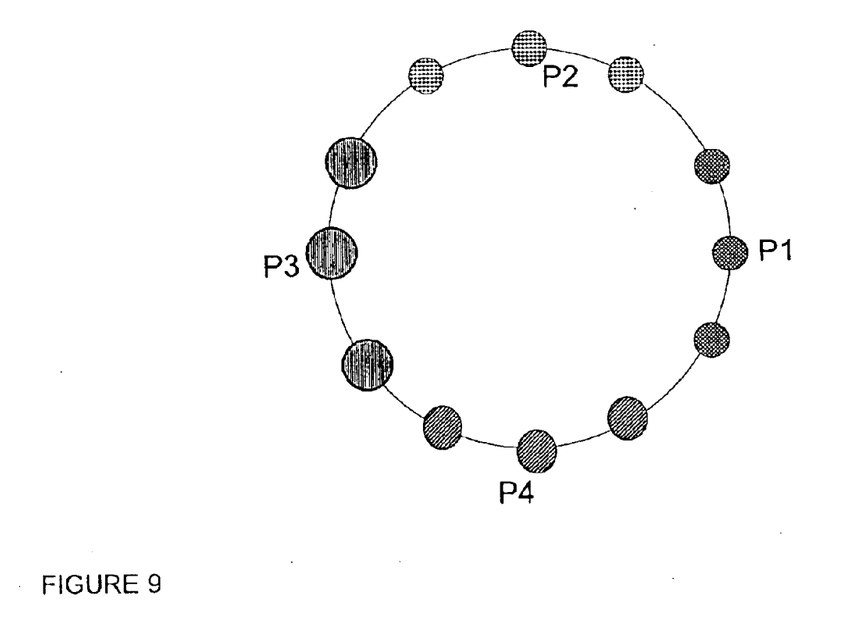
FIG. 9 illustrates sub-arrays of a circular array.

Referring now to FIG. 9, there is shown further embodiment of the present invention. A large antenna array is divided into a small number of groups called sub-arrays, in this case four groups, comprising, for example, two to ten elements, in this case three antenna elements each. Because antenna elements in each sub-array are closely spaced, an antenna element from each array can be chosen as a pilot antenna to transmit different signals as with the transmit diversity scheme. The feedback signal from the intended mobile is then used to place the constraint on the weights of each sub-array for the transmission of dedicated signals.

The magnitude information can be used to set the range for the magnitudes of sub-array weights and then to optimise all the antenna weights subject to such constraints. Alternatively, such magnitude information could be used to fix the magnitudes of each sub-array; weights and the phases of all the antenna weights are subsequently determined to optimise the beams. As discussed above, a direction finding function is required to perform such optimisation.

Figure 10:
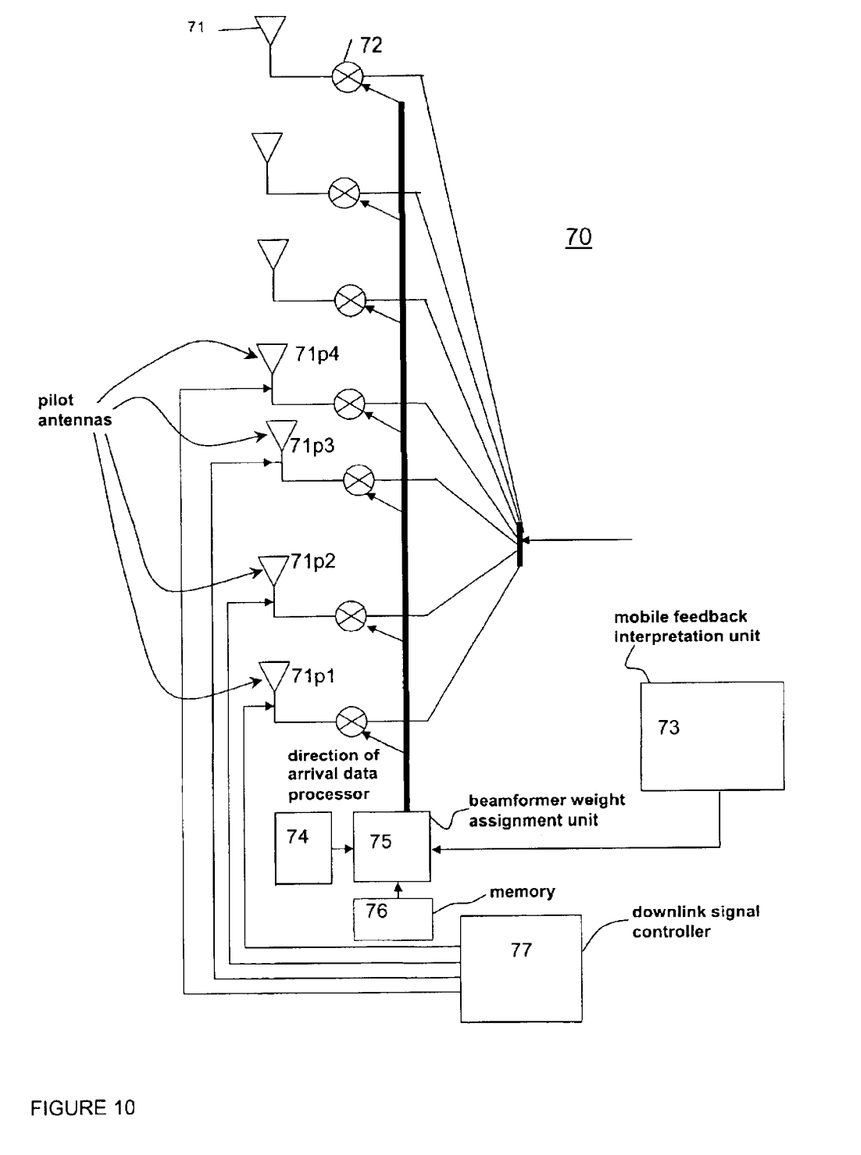
FIG. 10 illustrates a beamformer made in accordance with a further aspect of the present invention.

The optimum beam can either be generated in real time, provided that adequate signal processing power is available, or chosen from a pre-stored optimum set as described above. FIG. 10 shows the configuration of such a downlink beamformer, 70, where four pilot antennas, 71 *p*1 . . . 71*p*4 are used. The signalling for the downlink beams is controlled by unit 77: feedback from the mobiles is interpreted in unit 73 and data is used from unit 73 together with data from stored weight memory 76 and direction of arrival data from unit 74 in a weight assignment unit 75. Signals from the weight assignment unit are fed to the multiplier units in the input transmission line to the antennas. The beamformer corresponds to one suitable for the arrangement of antennas shown in FIG. 9, but only seven antennas are shown in the figure with the pilot antennas 71 *p*1–71*p*4 of FIG. 10 corresponding to pilot antennas 1, 2, 3 and 4 of FIG. 2, the total number of antennas will vary, depending upon the type of antenna employed, be it a circular array, for example, where the number is likely to be eight, twelve or sixteen in practice.

Figure 11:
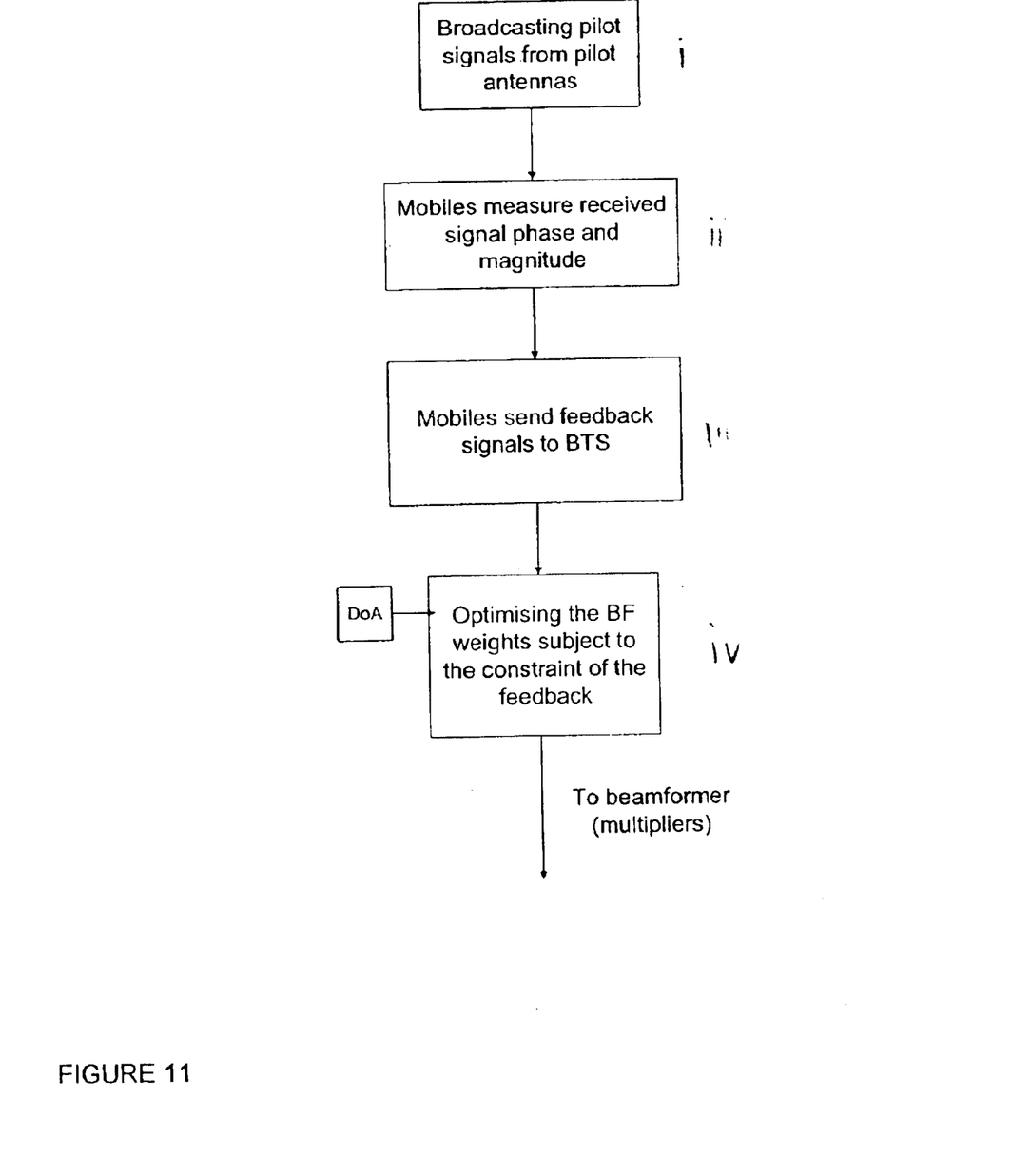
FIGS. 11–13 are flow charts relating to the operation of a beamformer in accordance with further aspects of the invention.

Referring now to FIG. 11, there is shown a flowchart which depicts the operation of the further aspect of the invention relating to pilot antennas. Essentially, the antenna array is grouped into a number of sub-arrays, for example each sub-array associated with a 90° period about an omnidirectional cell-site, with one or more pilot antennas from each sub-group being operable to broadcast pilot signals. The use of only one or only a small number of the antenna elements of a sub-array reduces the bandwidth required for signalling. Feedback received from a mobile in the area of coverage is used as constrain conditions for the optimisation of beamforming weights; no assumption on the antenna elements or array arrangement is made.

A detailed description will now follow: Each pilot antenna from each group of sub-arrays broadcasts pilot signals (step i). Mobile telephones active within the area of coverage measure the pilot signals in terms of signal phase and magnitude (step ii), which information is returned to the base transceiver station (BTS) (step iii). The beam forming weights are then optimised taking into account the constraint of the feedback and direction of arrival (DoA) information (step iv), which weights are passed to the beamforming means, which can conveniently take the form of multipliers.

Figure 12:
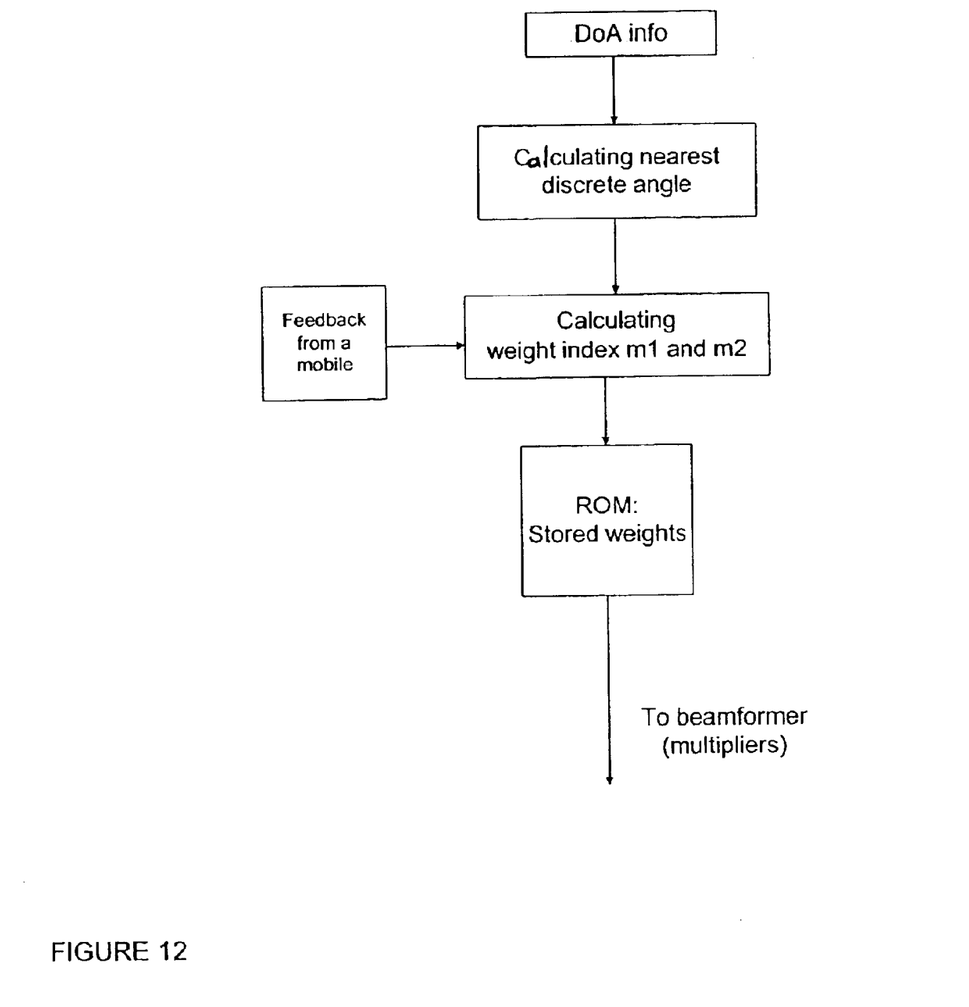

FIG. 12 shows a preferred means of implementing the general concept shown in FIG. 11. For each discrete angle, which is represented by index $m_1$, there is a number of pre-optimised weights corresponding to different feedback combinations which is denoted by index $m_2$. The number of pre-optimised weights could conveniently correspond with the main beams described above, with further pre-optimised weights for the interpolation beam directions, as appropriate.

Figure 13:
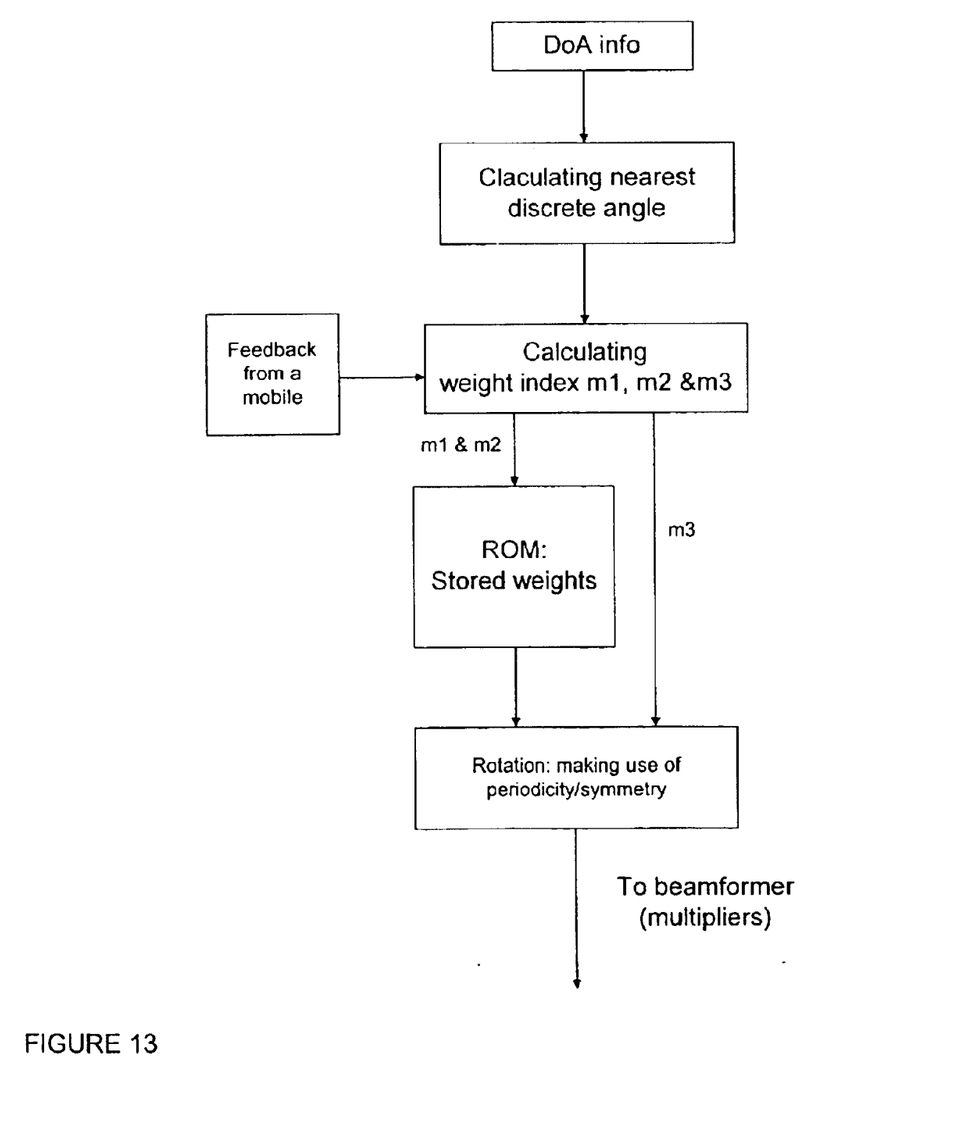

In FIG. 13, a third index $m_3$ is introduced to reflect the fact that there may be a certain symmetry/periodicity associated with the arrangement which can usefully be exploited, so that the number of stored weights can be reduced and, subsequently, an operation of rotation or reflection can be implemented.

What is claimed is:

1. A smart antenna basestation arrangement comprising a 2-dimensional array of antenna elements wherein:
   the antenna array provides omnidirectional beam coverage in a two dimensional azimuth plane, and
   stored beamforming weight sets optimised for specific beam directions are operable to enable the array to generate directional downlink beams in the azimuth plane; and
   the array has a physical periodicity whereby to reduce the number of principal weight sets for specific beam directions and whereby secondary weight sets are obtained by rotation.

2. An arrangement according to claim 1 wherein a number of angular directions are selected within an angle formed between two adjacent elements whereby to obtain a basic weight set group.

3. An arrangement according to claim 1 wherein, for angles between specific beam directions and periodic rotations thereof, the angles being either between a principal and a secondary angle or between adjacent secondary angles, the beamforming weights are determined by means of interpolation.

4. An arrangement according to claim 1 wherein the array comprises a circular array with a regular space in between the antenna elements.

5. An arrangement according to claim 1 wherein the array comprises a square array.

6. A smart antenna basestation arrangement comprising a two-dimensional array of antenna elements, wherein:
- the antenna array provides omnidirectional beam coverage in a two dimensional azimuth plane;
- the antenna elements are subdivided into a plurality of sub-arrays;
- stored beamforming weight sets optimized for specific beam directions are operable to enable the array to generate directional downlink beams in the azimuth plane; and
- a pilot antenna element from each sub-array is operable to broadcast common control channel signals, the array being operable to receive any feedback signals returned by mobile terminals in the area of coverage of the basestation;
- the arrangement being operable to apply stored weight data and direction of arrival data together with feedback range data to enable the array to generate directional downlink beams in the direction of said mobile terminal.

7. An arrangement according to claim 6 wherein selected elements from each sub-array are operable to broadcast common control channel signals.

8. The arrangement according to claim 6 wherein the feedback signals provide data regarding the amplitude and phase of the signal transmitted from each pilot antenna element.

9. An arrangement according to claim 6 wherein the feedback signal assists in the optimization of the amplitude and phase for the beamforming weights to be assigned for dedicated channels.

10. An arrangement according to claim 6 wherein the feedback signal assists in the optimisation of the phase for the beamforming weights to be assigned for dedicated channels.

11. An arrangement according to claim 6 wherein the feedback signal assists in the optimisation of the amplitude for the beamforming weights to be assigned for dedicated channels.

12. An arrangement according to claim 6 wherein phase information of the feedback signal is used to determine the phase of the pilot antenna weights.

13. An arrangement according to claim 6 wherein magnitude information of the feedback signal is used to assist the beam optimisation for dedicated channels.

14. A method of operating a smart antenna basestation arrangement comprising a 2-dimensional array in an azimuth plane of antennas comprising the steps of:
- storing beamforming weight sets optimized for specific beam directions whereby to enable the array to generate directional downlink beams; and
- obtaining secondary weight sets by rotation whereby to reduce the number of principal weight sets for specific beam directions; wherein,
- the antenna array provides omnidirectional beam coverage in a two-dimensional azimuth plane; and
- the array has a physical periodicity.

15. A method according to claim 14, comprising the step of selecting a number of angular directions within an angle formed between two adjacent elements whereby to obtain a basic weight set group.

16. A method according to claim 15 wherein, for angles between specific beam directions and periodic rotations thereof a principal and secondary angles or between adjacent secondary angles, the beamforming weights are determined by means of interpolation.

* * * * *